(12) United States Patent
Nishikawa

(10) Patent No.: US 9,031,160 B2
(45) Date of Patent: May 12, 2015

(54) COMMUNICATION DEVICE AND COMMUNICATION METHOD

(71) Applicant: Icom Incorporated, Osaka (JP)

(72) Inventor: Nobuyoshi Nishikawa, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 14/164,339

(22) Filed: Jan. 27, 2014

(65) Prior Publication Data
US 2014/0359355 A1    Dec. 4, 2014

(30) Foreign Application Priority Data

Jun. 3, 2013  (JP) ................. 2013-117201

(51) Int. Cl.
*H04L 25/03* (2006.01)
*H04L 7/00* (2006.01)
*H04L 1/18* (2006.01)

(52) U.S. Cl.
CPC .................... *H04L 1/1874* (2013.01)

(58) Field of Classification Search
CPC ............ H04L 27/2628; H04L 27/2634; H04L 27/265; H04L 43/0829; H04L 43/0847; H04L 1/0042; H04L 1/1819; H04L 27/2614; H04I 27/2615
USPC ................. 375/260, 295, 296, 297, 316, 358; 370/203, 210; 714/748, 749
See application file for complete search history.

(56) References Cited

U.S. PATENT DOCUMENTS 8,271,842 B2 * 9/2012 Nagaraja ................. 714/748

FOREIGN PATENT DOCUMENTS

JP    2006-165781    6/2006

* cited by examiner

*Primary Examiner* — Tesfaldet Bocure
(74) *Attorney, Agent, or Firm* — Warner Norcross & Judd LLP

(57) ABSTRACT

A modulator subjects an input signal to primary modulation to generate a primary modulated signal. A transmitter generates and transmits a transmission signal based on a secondary modulated signal generated from the primary modulated signal. A retransmission request receiver receives a retransmission request that contains identification information. An operator uses a data sequence that is a set of elements of a same number as a number of elements in an input signal identified by the identification information and with element values of 1 or 0 to generate operation data whose elements are values of exclusive OR of respective elements of the input signal and respective elements of the data sequence that are at same positions as positions of the respective elements of the input signal. If a retransmission request receiver receives a retransmission request, the modulator and transmitter perform the above processing using the operation data as an input signal.

18 Claims, 10 Drawing Sheets

COMMUNICATION DEVICE AND COMMUNICATION METHOD

CROSS-REFERENCE TO RELATED APPLICATION

This application claims the benefit of Japanese Patent Application No. 2013-117201, filed Jun. 3, 2013, the entire disclosure of which is incorporated by reference herein.

FIELD

This application relates to a communication device and a communication method.

BACKGROUND

In OFDM (Orthogonal Frequency-Division Multiplexing) system communication, input signals are subjected to subcarrier modulation, and the modulated signals are subjected to IFFT (Inverse Fast Fourier Transformation), thereby generating baseband signals. Therefore, if the size of FFT (Fast Fourier Transformation) increases due to the increased number of subcarriers, baseband signals with high peaks are generated, making PAPR (Peak-to-Average Power Ratio) high. The high PAPR may distort transmission signals due to characteristics of an amplifier at transmission side, degrading BER (Bit Error Rate). Therefore, arts to reduce PAPR in a multicarrier communication such as OFDM have been developed.

In an orthogonal frequency division multiplexing communication device disclosed in Unexamined Japanese Patent Application Kokai Publication No. 2006-165781, in order to reduce PAPR, prior to performing IFFT, the phase of a subcarrier modulated signal is controlled based on an optimal phase calculated by a sequential decision procedure.

Even if processing to reduce PAPR is performed, transmission signals may be distorted due to characteristics of an amplifier at transmission side, degrading BER. Effects such as noise in a transmission path may further degrade BER.

SUMMARY

The present invention was made in view of the above circumstances and has an objective of suppressing degradation of BER.

In order to achieve the above objective, a communication device according to a first aspect of the present invention includes:

a primary modulator that subjects an input signal to primary modulation to generate a primary modulated signal;

a secondary modulator that subjects the primary modulated signal to secondary modulation based on a communication scheme to generate a secondary modulated signal;

a transmitter that generates a transmission signal based on the secondary modulated signal and transmits the transmission signal;

a retransmission request receiver that receives a retransmission request that contains identification information identifying the input signal;

an operator that uses a data sequence that is a set of elements of a same number as a number of elements in the input signal and with element values of 1 or 0 to generate operation data whose elements are values of exclusive OR of respective elements of the input signal and respective elements of the data sequence that are at same positions as positions of the respective elements of the input signal; and a retransmitter, if the retransmission request receiver receives the retransmission request, that subjects an input signal identified by identification information contained in the retransmission request to processing by the operator and subjects resulting operation data as the input signal to processing by the primary modulator, the secondary modulator and the transmitter.

Preferably, the transmitter transmits, as the transmission signal, a signal that contains identification information identifying the input signal, and if the retransmission request receiver receives the retransmission request, the retransmitter performs processing by the transmitter using identification information identifying an input signal identified by identification information contained in the received retransmission request.

Preferably, if the retransmission request receiver has received a retransmission request previously and then receives another retransmission request that contains identification information identifying a same input signal as identified by the retransmission request received before, the retransmitter performs processing by the operator using a data sequence different from a data sequence used for processing by the operator for the other retransmission request received before.

Preferably, the operator uses, as the data sequence, a data sequence generated in such a way that among elements of a pseudorandom noise sequence values of elements whose values are −1 are replaced by 0.

A communication device according to a second aspect of the present invention includes:

a receiver that receives a transmission signal and subjects a baseband signal contained in the received transmission signal to serial-parallel conversion to generate a parallel signal;

a primary demodulator that demodulates the parallel signal based on a communication scheme to generate a primary modulated signal;

a determiner that determines whether it is necessary to retransmit a transmission signal generated from a same input signal as the received transmission signal has been generated based on a number of elements within a predetermined region on a complex plane among elements of the primary modulated signal;

a retransmission request transmitter that transmits a retransmission request that contains identification information identifying the same input signal as the received transmission signal has been generated if the determiner determines that retransmission of the transmission signal is necessary and a number of times of transmission of a retransmission request for the transmission signal is less than a threshold value;

a secondary demodulator that demodulates the primary modulated signal to generate a demodulated signal;

an inverse operator that uses a data sequence defined for each number of times of transmission of the retransmission request, the data sequence being a set of elements of a same number as a number of elements in the demodulated signal and with element values of 1 or 0 to generate inverse operation data whose elements are values of exclusive OR of respective elements of the demodulated signal and respective elements of a data sequence that are at same positions as positions of the respective elements of the demodulated signal; and an outputter that outputs the inverse operation data as reproduction data of the input signal.

Preferably, the receiver extracts identification information identifying an input signal at transmission side that corresponds to the received transmission signal from the received transmission signal, and the retransmission request transmitter sets a number of times of transmission of the retransmission request based on a number of times of transmission of a retransmission request for a transmission signal that contains identification information identifying a same input signal as an input signal identified by the identification information extracted from the received transmission signal.

Preferably, if the determiner determines that retransmission of the transmission signal is unnecessary and the number of times of transmission of the retransmission request has not reached the threshold value, the outputter outputs the inverse operation data corresponding to the transmission signal whose retransmission is determined to be unnecessary.

Preferably, if the number of times of transmission of the retransmission request has reached the threshold value, the outputter outputs data whose elements are average values or average values of elements whose absolute values are maximum and elements whose absolute values are minimum, of respective elements of a plurality of pieces of inverse operation data corresponding to a plurality of transmission signals that contain identification information identifying a same input signal as the received transmission signal has been generated.

Preferably, the inverse operator uses, as the data sequence defined for each number of times of transmission of the retransmission request, a data sequence generated in such a way that among elements of a pseudorandom noise sequence values of elements whose values are −1 are replaced by 0.

A communication method according to a third aspect of the present invention includes:

a primary modulation step of subjecting an input signal to primary modulation to generate a primary modulated signal;

a secondary modulation step of subjecting the primary modulated signal to secondary modulation based on a communication scheme to generate a secondary modulated signal;

a transmission step of generating a transmission signal based on the secondary modulated signal and transmitting the generated transmission signal;

a retransmission request receiving step of receiving a retransmission request that contains identification information identifying the input signal;

an operation step of using a data sequence that is a set of elements of a same number as a number of elements in the input signal and with element values of 1 or 0 to generate operation data whose elements are values of exclusive OR of respective elements of the input signal and respective elements of the data sequence that are at same positions as positions of the respective elements of the input signal; and a retransmission step of subjecting an input signal identified by identification information contained in the received retransmission request to processing of the operation step and of subjecting resulting operation data as the input signal to processing of the primary modulation step, the secondary modulation step and the transmission step if the retransmission request is received at the retransmission request receiving step.

Preferably, a signal that contains identification information identifying the input signal is transmitted as the transmission signal at the transmission step, and if the retransmission request is received at the retransmission request receiving step, processing at the transmission step is performed using identification information identifying an input signal identified by identification information contained in the received retransmission request at the retransmission step.

Preferably, if the retransmission request has been received before and then another retransmission request that contains identification information identifying a same input signal as identified by the retransmission request received before is received at the retransmission request receiving step, processing of the operation step is performed using a data sequence different from a data sequence used for processing of the operation step for the retransmission request that contains the identification information identifying the other input signal before at the retransmission step.

Preferably, at the operation step, a data sequence generated in such a way that values of elements whose values are −1 are replaced by 0 among elements of a pseudorandom noise sequence is used as the data sequence.

A communication method according to a fourth aspect of the present invention includes a receiving step of receiving a transmission signal and of subjecting a baseband signal contained in the received transmission signal to serial-parallel conversion to generate a parallel signal;

a primary demodulation step of demodulating the parallel signal based on a communication scheme to generate a primary modulated signal;

a determination step of determining whether it is necessary to retransmit a transmission signal generated from a same input signal as the received transmission signal has been generated based on a number of elements within a predetermined region on a complex plane among elements of the primary modulated signal;

a retransmission request transmission step of transmitting a retransmission request that contains identification information identifying a same input signal as the received transmission signal has been generated if it is determined that retransmission of the transmission signal is necessary at the determination step and a number of times of transmission of a retransmission request for the transmission signal is less than a threshold value;

a secondary demodulation step of demodulating the primary modulated signal to generate a demodulated signal;

an inverse operation step of using a data sequence defined for each number of times of transmission of the retransmission request, the data sequence being a set of elements of a same number as a number of elements as the demodulated signal and with element values of 1 or 0 to generate inverse operation data whose elements are values of exclusive OR of respective elements of the demodulated signal and respective elements of the data sequence that are at same positions as positions of the respective elements of the demodulated signal; and an output step of outputting the inverse operation data as reproduction data of the input signal.

Preferably, at the receiving step, identification information identifying an input signal at transmission side that corresponds to the received transmission signal is extracted from the received transmission signal, and at the retransmission request transmission step, a number of times of transmission of the retransmission request is set by a number of transmission of a retransmission request for a transmission signal that contains identification information identifying a same input signal as an input signal identified by identification information extracted from the received transmission signal.

Preferably, if it is determined that retransmission of the transmission signal is unnecessary at the determination step and the number of times of transmission of the retransmission request has not reached the threshold value, the inverse operation data that corresponds to the transmission signal whose retransmission is determined to be unnecessary is outputted at the output step.

Preferably, if the number of times of transmission of the retransmission request has reached the threshold value, data whose elements are average values or average values of elements whose absolute values are maximum and elements whose absolute values are minimum, of respective elements of a plurality of pieces of inverse operation data that correspond to a plurality of transmission signals that contain identification information identifying a same input signal as the received transmission signal has been generated is outputted at the output step.

Preferably, a data sequence generated in such a way that among elements of a pseudorandom noise sequence values of elements whose values are −1 are replaced by 0 is used, as the data sequence defined for each number of times of transmission of the retransmission request, at the inverse operation step.

The present invention can suppress degradation of BER.

BRIEF DESCRIPTION OF THE DRAWINGS

A more complete understanding of this application can be obtained when the following detailed description is considered in conjunction with the following drawings, in which.

DETAILED DESCRIPTION

Figure 1:
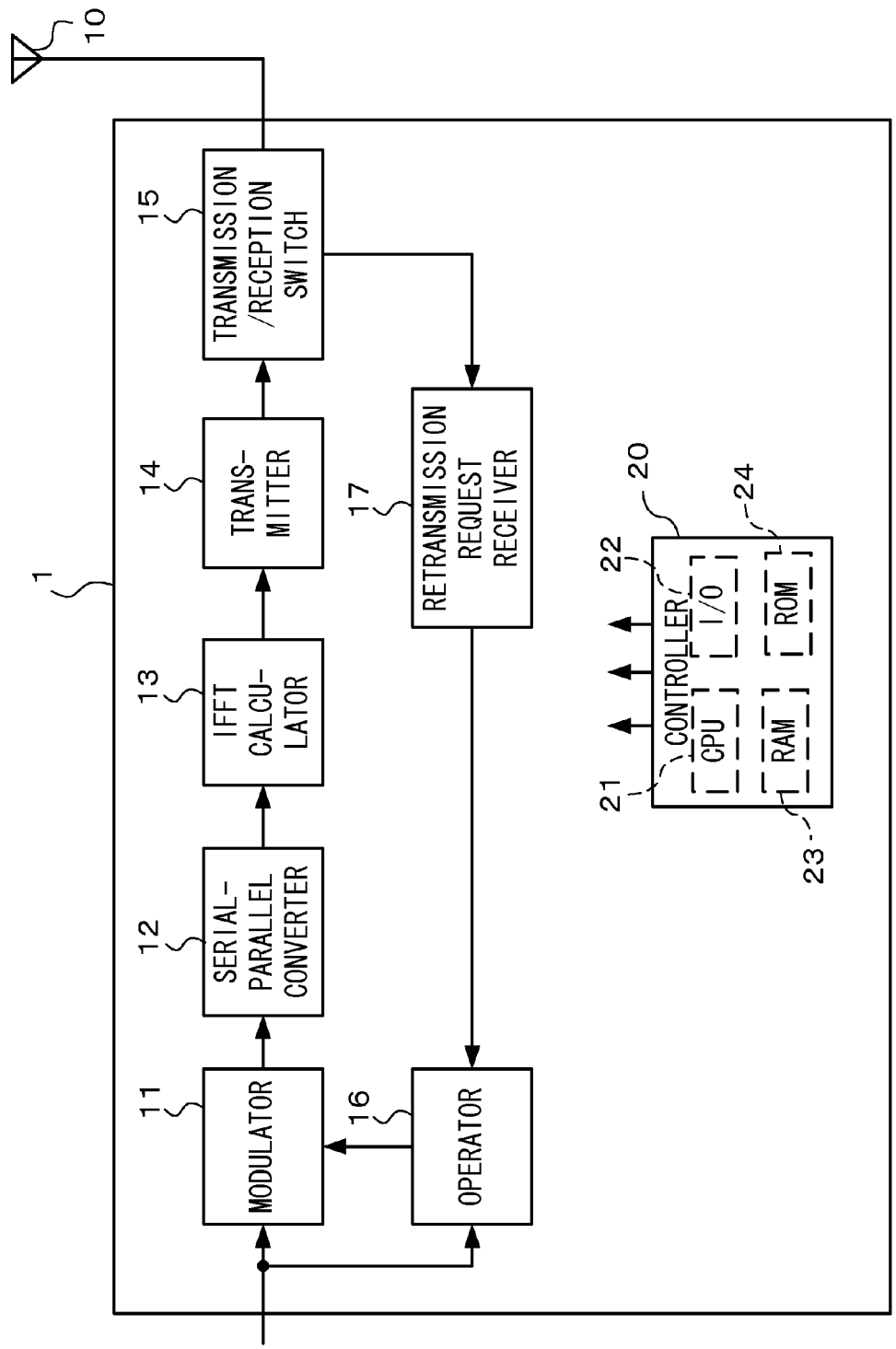
FIG. 1 is a block diagram illustrating an example of configuration of a communication device according to an embodiment of the present invention.

Hereinafter, an embodiment of the present invention will be described in detail with reference to drawings. In the drawings, identical or equivalent parts have the same reference numerals. In the following description, IFFT (Inverse Fast Fourier Transformation) includes not only IFFT but also IDFT (Inverse Discrete Fourier Transformation). Accordingly, the embodiment of the present invention may be configured to use IDFT, instead of IFFT. Similarly, FFT (Fast Fourier Transformation) includes not only FFT but also DFT (Discrete Fourier Transformation). In process of performing IDFT and DFT, the size of FFT in the following description means the size of DFT.

FIG. 1 is a block diagram illustrating an example of configuration of a communication device according to an embodiment of the present invention. A communication device 1 transmits a transmission signal to another device, and if the communication device 1 receives a retransmission request from the other device, the communication device 1 performs a predetermined operation processing and retransmits a transmission signal to the other device. The communication device 1 communicates with another device via OFDM (Orthogonal Frequency-Division Multiplexing) wireless communication. The communication device 1 includes an antenna 10, a modulator 11, a serial-parallel converter 12, an IFFT calculator 13, a transmitter 14, a transmission/reception switch 15, an operator 16, a retransmission request receiver 17 and a controller 20.

The controller 20 includes a CPU (Central Processing Unit) 21, a RAM (Random Access Memory) 23, and a ROM (Read-Only Memory) 24. For less complexity and easier understanding, signal lines from the controller 20 to the respective parts are not illustrated in the FIGS. Actually, the controller 20 connects to the respective parts of the communication device 1 via I/O (Input/Output) 22, starts and terminates processing of the parts and controls contents to be processed.

The RAM 23 stores data for generating a transmission signal. The ROM 24 stores a control program to be used for the controller 20 to control operation of the communication device 1. The controller 20 controls the communication device 1 based on the control program.

The modulator 11 subjects an input signal to primary modulation to generate a primary modulated signal. The modulator 11 sends the generated primary modulated signal to the serial-parallel converter 12. The primary modulation scheme is, for example, QPSK (Quadrature Phase-Shift Keying). The modulator 11 operates as primary modulator. The serial-parallel converter 12 subjects the primary modulated signal to serial-parallel conversion, and sends the primary modulated signals subjected to serial-parallel conversion to the IFFT calculator 13. The IFFT calculator 13 subjects the primary modulated signals already subjected to serial-parallel conversion to IFFT to generate inversely-transformed data, and sends the generated inversely-transformed data to the transmitter 14. The IFFT calculator 13 functions as secondary modulator that subjects the primary modulated signals to secondary modulation based on a communication scheme to generate a secondary modulated signal.

The communication device 1 generates identification information that identifies an input signal. The identification information may be given as part of an input signal from outside the communication device 1. As long as the identification information identifies an input signal, a plurality of pieces of identification information may be associated with one input signal. Any size and value of identification information can be adopted. The transmitter 14 combines the inversely-transformed data to generate a baseband signal. The transmitter 14 generates a transmission signal based on identification information that identifies an input signal corresponding to the baseband signal and the baseband signal, and sends the generated transmission signal to another device. The transmission signal can contain any number of pieces of identification information and any number of baseband signals. The transmission signal may contain data that is modulated identification information. In this case, transmission side and reception side share information for modulating and demodulating the identification information.

When a primary modulation scheme is QPSK and the size of FFT is N, an input signal b is represented by equation (1) below. When a primary modulated signal subjected to serial-parallel conversion is d, inversely-transformed data f is represented by equation (2) below, where $F^{-1}$ is an IFFT matrix.

[Eq. 1]

$$b=[b_1 b_2 \ldots b_{2N}] \quad (1)$$

[Eq. 2]

$$f=F^{-1} \cdot d \quad (2)$$

Figure 2:
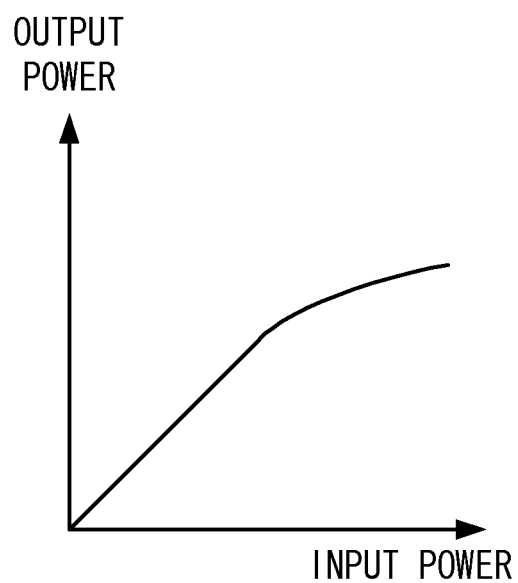
FIG. 2 is an example of characteristics of an amplifier according to the embodiment.
Figure 3:
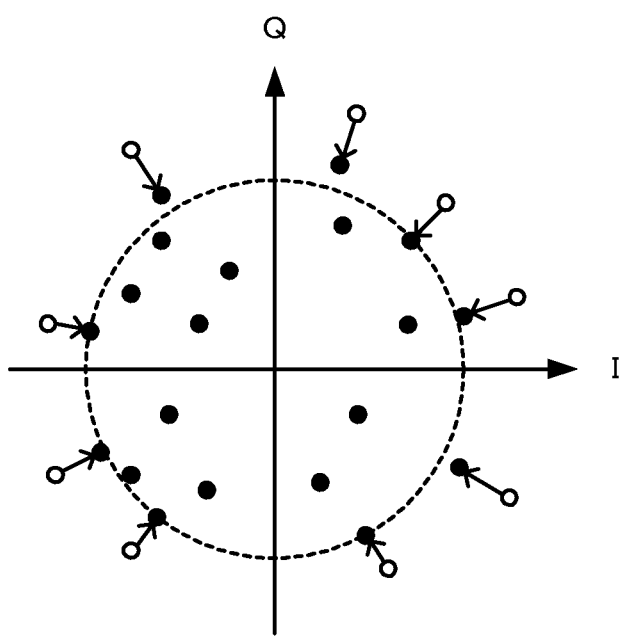
FIG. 3 is an example of output signals from the amplifier according to the embodiment.

The transmitter 14 includes an amplifier. The transmitter 14 uses the amplifier to amplify the transmission signal, and sends the amplified transmission signal to another device. FIG. 2 is a diagram illustrating an example of characteristics of an amplifier according to the embodiment. In general, when an input power increases and as a result an output power exceeds a saturation point (an output signal saturation point), characteristics of an amplifier lose linearity. Relationship between an input power and an output power in a nonlinear range can be approximately represented by a quadratic curve or a cubic curve. FIG. 3 is a diagram illustrating an example of output signals from the amplifier according to the embodiment. Signals outputted by the amplifier are represented by filled circles on a complex plane. The horizontal axis indicates real parts of the output signals and the vertical axis indicates imaginary parts thereof. In FIG. 3, outside of a dashed-line circle is the nonlinear range of the amplifier. Input signals to the amplifier that fall within the nonlinear range are represented by open circles. FIG. 3 shows that the level of each input signal is reduced in the nonlinear range of the amplifier.

Nonlinearity of the amplifier distorts a transmission signal from the communication device 1, degrading BER (Bit Error Rate). When BER is degraded to a certain degree, another device that has received the transmission signal transmits a retransmission request to the communication device 1. Operation of the communication device 1 receiving a retransmission request will be described below.

The retransmission request receiver 17 receives a retransmission request that contains identification information from another device via the antenna 10 and transmission/reception switch 15. If the retransmission request receiver 17 receives a retransmission request, the retransmission request receiver 17 notifies the operator 16 of having received a retransmission request. The operator 16 uses any data sequence that is a set of elements of a same number as a number of elements in an input signal identified by identification information contained in the retransmission request thereby and with element values of 1 or 0 to generate operation data whose elements are values of exclusive OR of the respective elements of the input signal and respective elements of the data sequence that are at the same positions as positions of the respective elements of the input signal. Correspondence between identification information and an input signal identified by the identification information is stored in, for example, the RAM 23. The operator 16 sends the generated operation data to the modulator 11.

For example, if the retransmission request receiver 17 has received a retransmission request previously and then receives another retransmission request that contains identification information identifying the same input signal as was identified by the retransmission request received previously, the operator 16 performs the above processing using a data sequence different from a data sequence used in the above processing for the other retransmission request that contains identification information identifying the same input signal as the received transmission signal has been generated before. That is, the operator 16 performs the above processing using a data sequence different from a data sequence used previously for a retransmission request from the second time that contains identification information identifying the same input signal as the received transmission signal has been generated. As will be described later, the use of a different data sequence can reduce degradation of BER.

The operator 16 uses, as the data sequence, for example, a data sequence generated in such a way that among elements of a PN (Pseudorandom Noise) sequence comprising elements +1 or −1, elements whose values are −1 are replaced by 0. The data sequence is not limited to the data sequence based on the PN sequence; but may be a random data sequence in which values of elements are 1 or 0; a data sequence generated in such a way that among elements of a CAZAC (constant amplitude zero auto-correlation) sequence, values of elements whose absolute values are greater than or equal to a threshold value are set to be 1 and values of elements whose absolute values are less than the threshold are set to be 0; or a data sequence generated in such a way that among elements of a data sequence comprising a real part or an imaginary part of a CAZAC sequence, values of elements whose absolute values are greater than or equal to a threshold value are set to be 1 and values of elements whose absolute values are less than the threshold value are set to be 0.

The modulator 11 subjects the sent operation data to primary modulation to generate a primary modulated signal, and sends the generated primary modulated signal to the serial-parallel converter 12. As described above, the serial-parallel converter 12 subjects the primary modulated signal to serial-parallel conversion, and sends the primary modulated signals subjected to serial-parallel conversion to the IFFT calculator 13. The IFFT calculator 13 subjects the primary modulated signals subjected to serial-parallel conversion to IFFT to generate inversely-transformed data, and sends the generated inversely-transformed data to the transmitter 14. The transmitter 14 combines the inversely-transformed data to generate a baseband signal, generates a transmission signal based on the identification information identifying an input signal used by the operator 16 and the baseband signal, and sends the generated transmission signal to the other device that has transmitted the retransmission request.

If the retransmission request receiver 17 receives a retransmission request, the controller 20 functions as retransmitter, the retransmitter subjecting an input signal identified by identification information contained in the received retransmission request to processing by the operator 16, and further subjecting the operation data generated by the operator 16 as an input signal to the above processing by the modulator 11, serial-parallel converter 12, IFFT calculator 13 and transmitter 14. When the controller 20 performs processing by the transmitter 14 as the retransmitter, the controller 20 uses identification information identifying an input signal identified by identification information contained in the received retransmission request, and generates a signal that contains the identification information identifying the input signal.

By generating a transmission signal based on operation data whose elements are values of exclusive OR of an input signal and a data sequence with a relatively low PAPR, such as a PN sequence, random data or a CAZAC sequence, effects of distortion by the amplifier can be reduced, thereby suppressing degradation of BER.

A case in which the communication device 1 receives a retransmission request a plurality of times will be described as an example. If the first retransmission request that contains identification information identifying an input signal b represented by the above equation (1) is received, the operator 16 uses a data sequence $p^{(1)}$ represented by equation (3) below. Numbers in parentheses of the suffix indicate the number of times of receipt of a retransmission request. Operation data $b^{(1)}$ generated by the operator 16 is represented by equation (4) below. When $d^{(1)}$ is primary modulated signals subjected to serial-parallel conversion based on the operation data $b^{(1)}$ represented by equation (4) below, inversely-transformed data $f^{(1)}$ is represented by equation (5) below. The transmitter 14 transmits a transmission signal based on the identification information and inversely-transformed data $f^{(1)}$.

[Eq. 3]
$$p^{(1)} = [p_1^{(1)} p_2^{(1)} \ldots p_{2N}^{(1)}] \quad (3)$$

[Eq. 4]
$$b^{(1)} = [XOR(b_1, p_1^{(1)}) XOR(b_2, p_2^{(1)}) \ldots XOR(b_{2N}, p_{2N}^{(1)})] \quad (4)$$

[Eq. 5]
$$f^{(1)} = F^{-1} \cdot d^{(1)} \quad (5)$$

If the retransmission request receiver 17 receives the second retransmission request for the input signal b represented by the above equation (1), the operator 16 uses a data sequence $p^{(2)}$ represented by equation (6) below. The data sequence $p^{(2)}$ is different from the data sequence $p^{(1)}$. Operation data $b^{(2)}$ generated by the operator 16 is represented by equation (7) below. When $d^{(2)}$ is primary modulated signals subjected to serial-parallel conversion based on the operation data $b^{(2)}$ represented by equation (7) below, inversely-transformed data $f^{(2)}$ is represented by equation (8) below. The transmitter 14 transmits a transmission signal based on the identification information and inversely-transformed data $f^{(2)}$.

[Eq. 6]
$$p^{(2)} = [p_1^{(2)} p_2^{(2)} \ldots p_{2N}^{(2)}] \quad (6)$$

[Eq. 7]
$$b^{(2)} = [XOR(b_1, p_1^{(2)}) XOR(b_2, p_2^{(2)}) \ldots XOR(b_{2N}, p_{2N}^{(2)})] \quad (7)$$

[Eq. 8]
$$f^{(2)} = F^{-1} \cdot d^{(2)} \quad (8)$$

Figure 4:
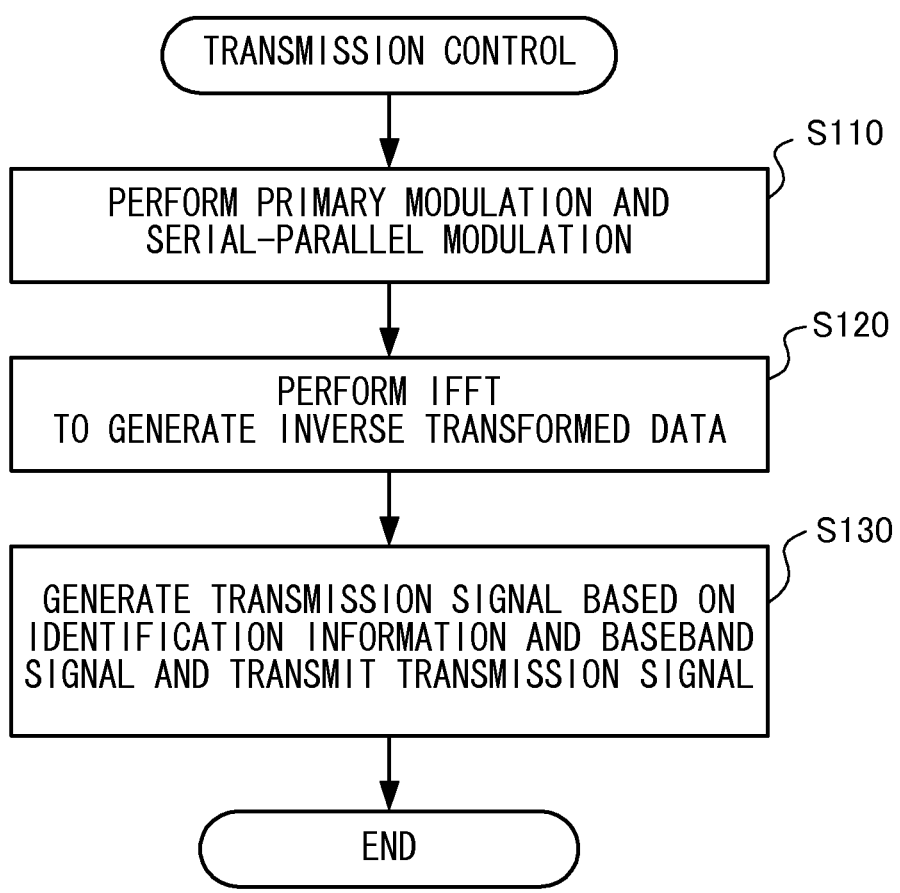
FIG. 4 is a flow chart illustrating one example of transmission control operation that is performed by the communication device according to the embodiment.

FIG. 4 is a flow chart illustrating one example of a transmission control operation that is performed by the communication device according to the embodiment. The modulator 11 subjects an input signal to primary modulation to generate a primary modulated signal. The serial-parallel converter 12 subjects the primary modulated signal to serial-parallel conversion (step S110). The IFFT calculator 13 subjects the primary modulated signals subjected to serial-parallel conversion to IFFT to generate inversely-transformed data (step S120). The transmitter 14 combines the inversely-transformed data to generate a baseband signal, generates a transmission signal based on identification information that identifies the input signal and the baseband signal, and transmits the generated transmission signal to another device (step S130).

Figure 5:
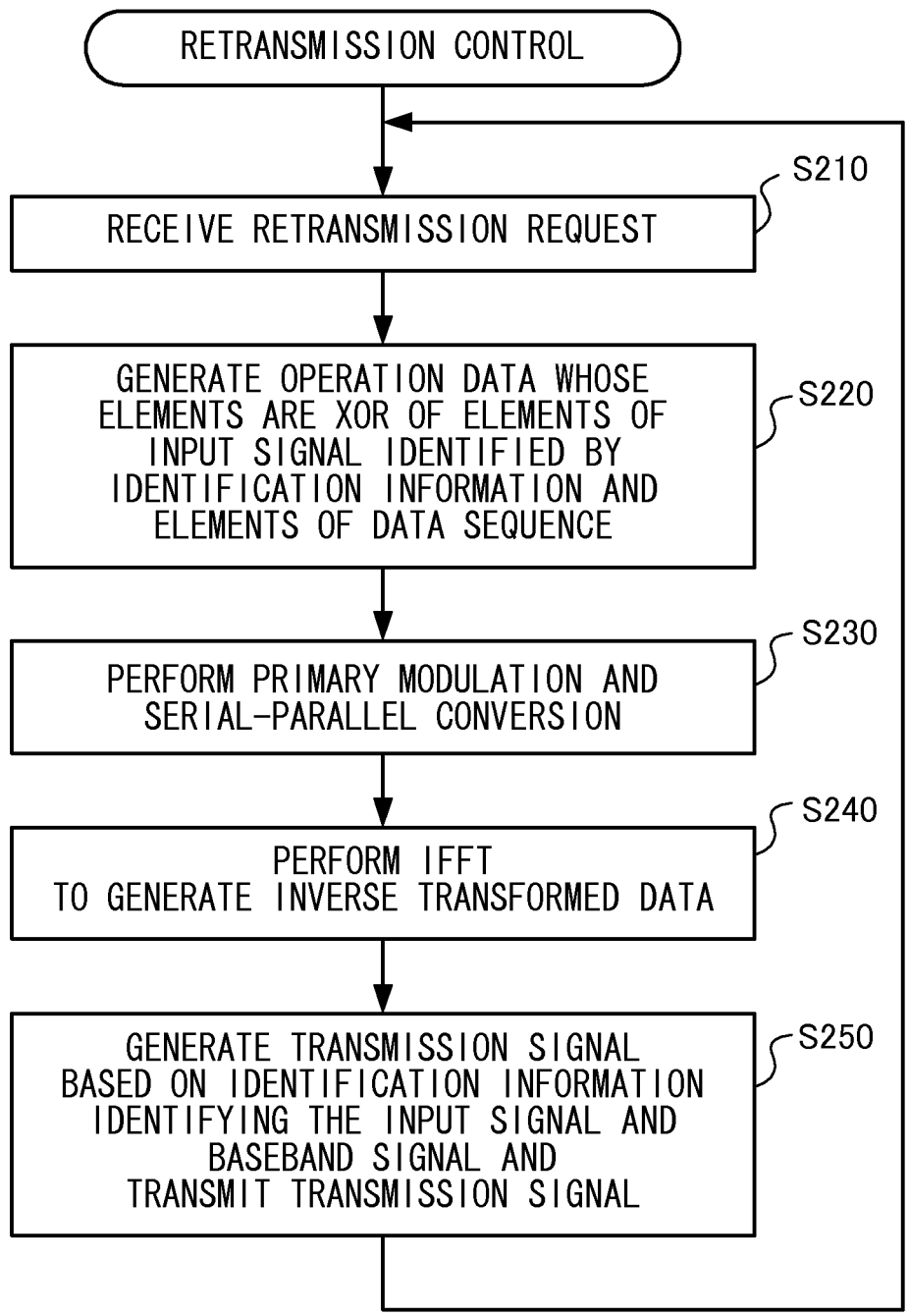
FIG. 5 is a flow chart illustrating one example of retransmission control operation that is performed by the communication device according to the embodiment.

FIG. 5 is a flow chart illustrating one example of a retransmission control operation that is performed by the communication device according to the embodiment. The retransmission request receiver 17 receives a retransmission request containing identification information from another device via the antenna 10 and transmission/reception switch 15 (step S210). The operator 16 uses any data sequence that is a set of elements of a same number as a number of elements in an input signal identified by the identification information and with element values of 1 or 0 to generate operation data whose elements are exclusive OR of the respective elements of the input signal and respective elements of the data sequence at the same positions as positions of the respective elements of the input signal (step S220). The modulator 11 subjects the sent operation data to primary modulation to generate a primary modulated signal, and the serial-parallel converter 12 subjects the primary modulated signal to serial-parallel conversion (step S230). The IFFT calculator 13 subjects the primary modulated signals subjected to serial-parallel conversion to IFFT to generate inversely-transformed data (step S240). The transmitter 14 combines the inversely-transformed data to generate a baseband signal, generates a transmission signal based on the identification information identifying the input signal and the baseband signal, and transmits the generated transmission signal to the other device that has transmitted the retransmission request (step S250). The communication device 1 performs the above processing using a data sequence different from a data sequence used before for a retransmission request on and after the second time that contains identification information identifying the same input signal as the received transmission signal has been generated.

Figure 6:
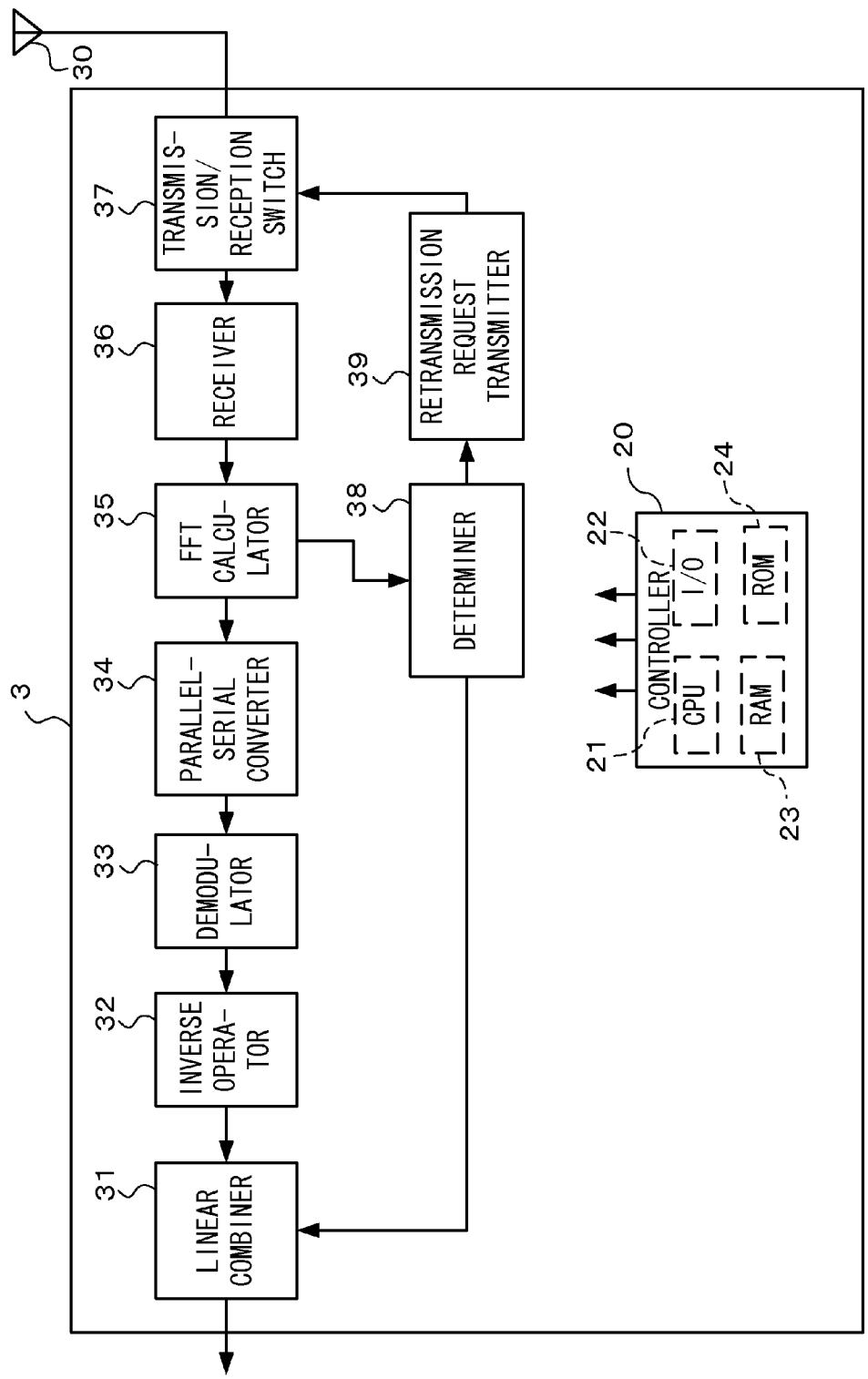
FIG. 6 is a block diagram illustrating an example of different configuration of the communication device according to the embodiment.

FIG. 6 is a block diagram illustrating an example of configuration of a different communication device according to the embodiment. A communication device 3 receives a transmission signal from another device and transmits a retransmission request for a transmission signal to the other device according to need. The communication device 3 includes an antenna 30, a linear combiner 31, an inverse operator 32, a demodulator 33, a parallel-serial converter 34, a FFT calculator 35, a receiver 36, a transmission/reception switch 37, a determiner 38 and a retransmission request transmitter 39. A case in which the communication device 3 receives a transmission signal transmitted by the communication device 1 will be described as an example.

The receiver 36 receives a transmission signal via the antenna 30 and transmission/reception switch 37. The receiver 36 extracts identification information from the received transmission signal. The receiver 36 further subjects a baseband signal contained within the received transmission signal to serial-parallel conversion to generate parallel signals, and sends the generated parallel signals to the FFT calculator 35. The FFT calculator 35 subjects the parallel signals to FFT to generate primary modulated signals, and sends the generated primary modulated signals to the parallel-serial converter 34 and determiner 38. Identification information identifies an input signal at transmission side that corresponds to the transmission signal. Correspondence among identification information, an input signal identified by the identification information, and primary modulated signals is stored in, for example, the RAM 23. The FFT calculator 35 functions as primary demodulator that subjects the parallel signals to demodulation based on a communication scheme to generate primary modulated signals.

The parallel-serial converter 34 subjects the primary modulated signals to parallel-serial conversion, and sends the primary modulated signal subjected to parallel-serial conversion to the demodulator 33. The demodulator 33 demodulates the primary modulated signal subjected to parallel-serial conversion to generate a demodulated signal, and sends the generated demodulated signal to the inverse operator 32. The demodulator 33 functions as secondary demodulator that demodulates the primary modulated signal to generate a demodulated signal.

Figure 7:
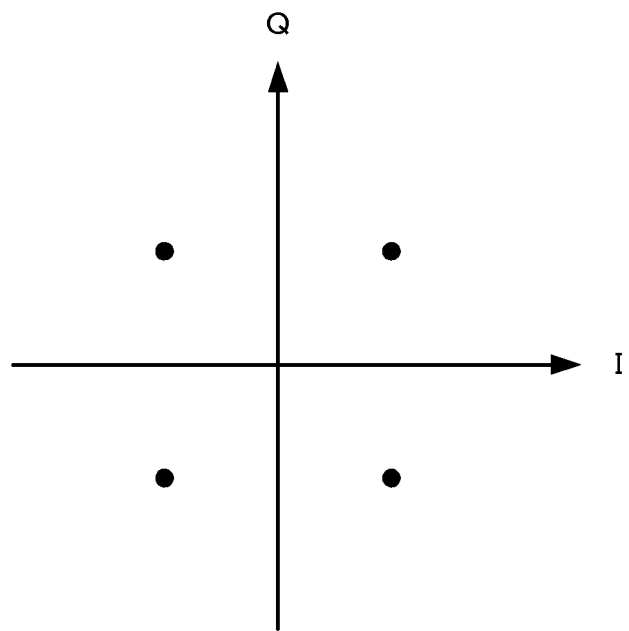
FIG. 7 is an example of a signal constellation diagram according to the embodiment.
Figure 8:
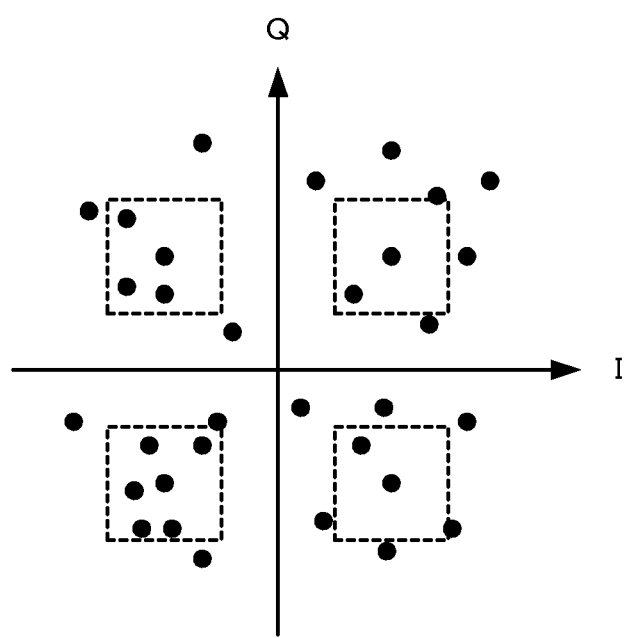
FIG. 8 is a diagram illustrating an example of primary modulated signals demodulated according to the embodiment.

The determiner 38 determines whether it is necessary to retransmit a transmission signal generated from the same input signal as the received transmission signal has been generated based on the number of elements within a predetermined region on the complex plane among elements of the primary modulated signals. The determiner 38 sends a result of the determination to the linear combiner 31, and, if retransmission is necessary, notifies the retransmission request transmitter 39 that retransmission is necessary. FIG. 7 is an example of a signal constellation diagram according to the embodiment. FIG. 7 illustrates a signal constellation diagram of primary modulated signals outputted from the modulator 11 if the modulator 11 uses QPSK as the primary modulation scheme. FIG. 8 is a diagram illustrating an example of demodulated primary modulated signals according to the embodiment. Distortion of a transmission signal due to non-linearity of the amplifier in the transmitter 14 and effects of noise in a transmission path cause the primary modulated signals outputted from the FFT calculator 35 to be dispersed as illustrated in FIG. 8. In the present embodiment, a transmission path refers to a wireless transmission path.

For example, the determiner 38 determines that retransmission is unnecessary if the number of elements of the primary modulated signals within a predetermined region on the complex plane indicated by a dashed line in FIG. 8 is greater than or equal to a threshold value, and determines that retransmission is necessary if the number of elements of the primary modulated signals within the region is less than the threshold value. The above predetermined region and threshold value can be arbitrarily set according to the required level of BER. For example, the above predetermined region may be within a square whose center of gravity is each point of the signal constellation diagram in FIG. 7 and whose length of each side is a predetermined value such as 0.08 on the complex plane. The threshold value may be a value found by multiplying the size of FFT by, for example, a predetermined value such as ¾.

If the determiner 38 determines that retransmission of a transmission signal is necessary and the number of times of transmission of a retransmission request for the transmission signal is less than a threshold value, the retransmission request transmitter 39 transmits a retransmission request that contains identification information identifying the input signal to the communication device 1. The retransmission request transmitter 39 sets the number of times of transmission of a retransmission request based on the number of times of transmission of a retransmission request for a transmission signal that contains identification information identifying the same input signal as an input signal at transmission side identified by an identification signal extracted from a received transmission signal. If the number of times of transmission of the retransmission request has reached the threshold value, the retransmission request transmitter 39 does not transmit a retransmission request. Correspondence between an input signal at transmission side and the number of times of transmission of the retransmission request may be stored in, for example, the RAM 23, or be notified each part of the communication device 3 by the retransmission request transmitter 39. The determiner 38 determines whether retransmission is necessary based on the primary modulated signals and the retransmission request transmitter 39 transmits a retransmission request, thereby reducing degradation of BER.

If the number of times of transmission of the retransmission request is 0, that is, if the inverse operator 32 receives the first demodulated signal for an input signal at transmission side, the inverse operator 32 adopts the received demodulated signal as inverse operation data. Or, the inverse operator 32 uses a data sequence that is a set of elements of a same number as a number of elements of the demodulated signal and with element values of 0 to generate inverse operation data whose elements are exclusive OR of the respective elements of the demodulated signal and respective elements of the data sequence that are at the same positions as positions of the respective elements of the demodulated signal. That is, if the number of times of transmission of the retransmission request is 0, the inverse operation data coincides with the demodulated signal. The inverse operator 32 sends the inverse operation data to the linear combiner 31.

If the number of times of transmission of the retransmission request is greater than or equal to 1, the inverse operator 32 uses, a data sequence defined for each number of times of transmission of a retransmission request, the data sequence being a set of elements of a same number as a number of elements in a demodulated signal and with element values of 1 or 0, to generate inverse operation data whose elements are exclusive OR of the respective elements of the demodulated signal and respective elements of the data sequence that are at the same positions as positions of the respective elements of the demodulated signal. The inverse operator 32 sends the generated inverse operation data to the linear combiner 31. The data sequence defined for each number of times of transmission of a retransmission request coincides with the data sequence used by the operator 16 for each number of times of reception of a retransmission request in the communication device 1. That is, in the above example, the inverse operator 32 uses a data sequence $p^{(1)}$ represented by the above equation (3) in the first retransmission, and a data sequence $p^{(2)}$ represented by the above equation (6) in the second retransmission.

The above processing is repeated until the determiner 38 determines that retransmission of a transmission signal is unnecessary or until the number of times of transmission of the retransmission request reaches a threshold value.

The linear combiner 31 functions as outputter that outputs reproduction data of an input signal corresponding to the received transmission signal. For example, if the determiner 38 determines that retransmission of a transmission signal is unnecessary and the number of times of transmission of a retransmission request for a transmission signal that contains identification information identifying the same input signal as the transmission signal has not reached a threshold value, the linear combiner 31 outputs inverse operation data corresponding to the transmission signal whose retransmission is determined to be unnecessary as reproduction data of the input signal. Inverse operation data corresponding to the transmission signal whose retransmission is determined to be unnecessary is inverse operation data generated from a transmission signal received by the receiver 36 when the determiner 38 determines that retransmission is unnecessary. If the number of times of transmission of a retransmission request for a transmission signal that contains identification information identifying the same input signal as the received transmission signal has been generated has reached a threshold value, the linear combiner 31 linearly combines a plurality of pieces of inverse operation data corresponding to a plurality of transmission signals that contain identification information identifying the same input signal as the received transmission signal has been generated at transmission side using coefficients, each of the coefficients being a real number greater than or equal to 0 and the sum of the coefficients being 1, and outputs the resulting data. For example, the linear combiner 31 outputs, as the data obtained by linearly combining a plurality of pieces of inverse operation data, data whose elements are average values or average values of elements whose absolute values are at maximum and elements whose absolute values are minimum, of respective elements of the plurality of pieces of inverse operation data, each being generated from each of transmission signals the receiver 36 has received by the time the number of times of transmission of a retransmission request reaches a threshold value.

Operation of the communication device 3 when a threshold value of a retransmission request is 2 will be described as an example. If the number of times of transmission of a retransmission request is 0, the inverse operator 32 outputs inverse operation data coinciding with a demodulated signal v for a transmission signal first received for an input signal at transmission side. If the determiner 38 determines that retransmission of a transmission signal is unnecessary, the linear combiner 31 outputs inverse operation data coinciding with the demodulated signal v.

In the case where the determiner 38 determines that retransmission of a transmission signal is necessary, since the number of times of transmission of a retransmission request for a transmission signal that contains identification information identifying the input signal is 0, that is, less than the threshold value 2, the retransmission request transmitter 39 transmits a retransmission request that contains identification information identifying the input signal to the communication device 1. After that, the communication device 3 receives a transmission signal from the communication device 1 again. Then, the inverse operator 32 outputs inverse operation data $w^{(1)}$ for a transmission signal secondarily received for the input signal to the linear combiner 31, elements of the inverse operation data $w^{(1)}$ being values of exclusive OR of respective elements of a demodulated signal $v^{(1)}$ and respective elements of a data sequence $p^{(1)}$ at the same positions as positions of the respective elements of the demodulated signal $v^{(1)}$. The inverse operation data $w^{(1)}$ is represented by equation (9) below. If the determiner 38 determines that retransmission of a transmission signal is unnecessary, the linear combiner 31 outputs the inverse operation data $w^{(1)}$. Assuming that there is neither distortion of a transmission signal due to nonlinearity of the amplifier nor effects of noise in a transmission path, since a demodulated signal $v^{(1)}$ coincides with $b^{(1)}$, the inverse operation data $w^{(1)}$ coincides with an input signal b represented by the above equation (1).

[Eq. 9]

$$w^{(1)} = [XOR(v_1^{(1)}, p_1^{(1)}) XOR(v_2^{(1)}, p_2^{(1)}) \ldots XOR(v_{2N}^{(1)}, p_{2N}^{(1)})] \quad (9)$$

As described above, the determiner 38 determines that retransmission of a transmission signal is unnecessary if primary modulated signals of a received transmission signal fulfill a predetermined standard. As described above, if the determiner 38 determines that retransmission is necessary in first receiving a transmission signal and then determines that retransmission is unnecessary in receiving a retransmitted transmission signal, it means that retransmission permits communication with a transmission signal having a better quality.

In the case where the determiner 38 determines that retransmission of a transmission signal is necessary, since the number of times of transmission of a retransmission request for a transmission signal that contains identification information identifying the input signal is 1, that is, less than the threshold value 2, the retransmission request transmitter 39 transmits a retransmission request that contains identification information identifying the input signal to the communication device 1. After that, the communication device 3 receives a transmission signal from the communication device 1 again. Then, the inverse operator 32 outputs inverse operation data $w^{(2)}$ for a transmission signal thirdly received for the input signal, elements of the inverse operation data $w^{(2)}$ being exclusive OR of respective elements of a demodulated signal $v^{(2)}$ and respective elements of a data sequence $p^{(2)}$ that are at the same positions as positions of the respective elements of the demodulated signal $v^{(2)}$. The inverse operation data $w^{(2)}$ is represented by equation (10) below. Since the number of times of transmission of a retransmission request has reached the threshold value 2, the linear combiner 31 outputs data represented by equation (11) below, elements of the data being, for example, average values of respective elements of a plurality of pieces of inverse operation data, each being generated from each of transmission signals that contain identification information identifying the same input signal as the received transmission signal has been generated. Even if the determiner 38 determines that retransmission of a transmission signal is necessary, since the number of times of transmission of a retransmission request for a transmission signal that contains identification information identifying the input signal is 2 and has reached the threshold value 2, the retransmission request transmitter 39 does not transmit a retransmission request.

[Eq. 10]

$$w^{(2)} = [XOR(v_1^{(2)}, p_1^{(2)}) \quad XOR(v_2^{(2)}, p_2^{(2)}) \quad \ldots \quad XOR(v_{2N}^{(2)}, p_{2N}^{(2)})] \quad (10)$$

[Eq. 11]

$$z = \frac{1}{3}(v + w^{(1)} + w^{(2)}) \quad (11)$$

As described above, at the time of the first retransmission, data obtained in such a way that an input signal is subjected to operation using a data sequence $p^{(1)}$ with primary and secondary modulations is transmitted and received. Therefore, distortion of a transmission signal due to the amplifier that appears in inverse operation data $w^{(1)}$ is different from distortion that appears in a demodulated signal v. Similarly, at the time of the second retransmission, is transmitted and received data subjected to operation using a data sequence $p^{(2)}$ different from the data sequence $p^{(1)}$. Therefore, distortion of a transmission signal due to the amplifier that appears in inverse operation data $w^{(2)}$ is different from distortion that appears in the demodulated signal v or inverse operation data $w^{(1)}$.

Then, by outputting data whose elements are average values of respective elements of a plurality of inverse operation data (demodulated signal v, inverse operation data $w^{(1)}$, inverse operation data $w^{(2)}$), effects on distortion of a transmission signal of the amplifier can be reduced and effects of gaussian noise also can be suppressed, thereby suppressing degradation of BER. Or, by outputting data whose elements are average values of elements whose absolute values are maximum and elements whose absolute values are minimum, of respective elements of the plurality of inverse operation data, similar advantageous effects can be obtained.

Figure 9:
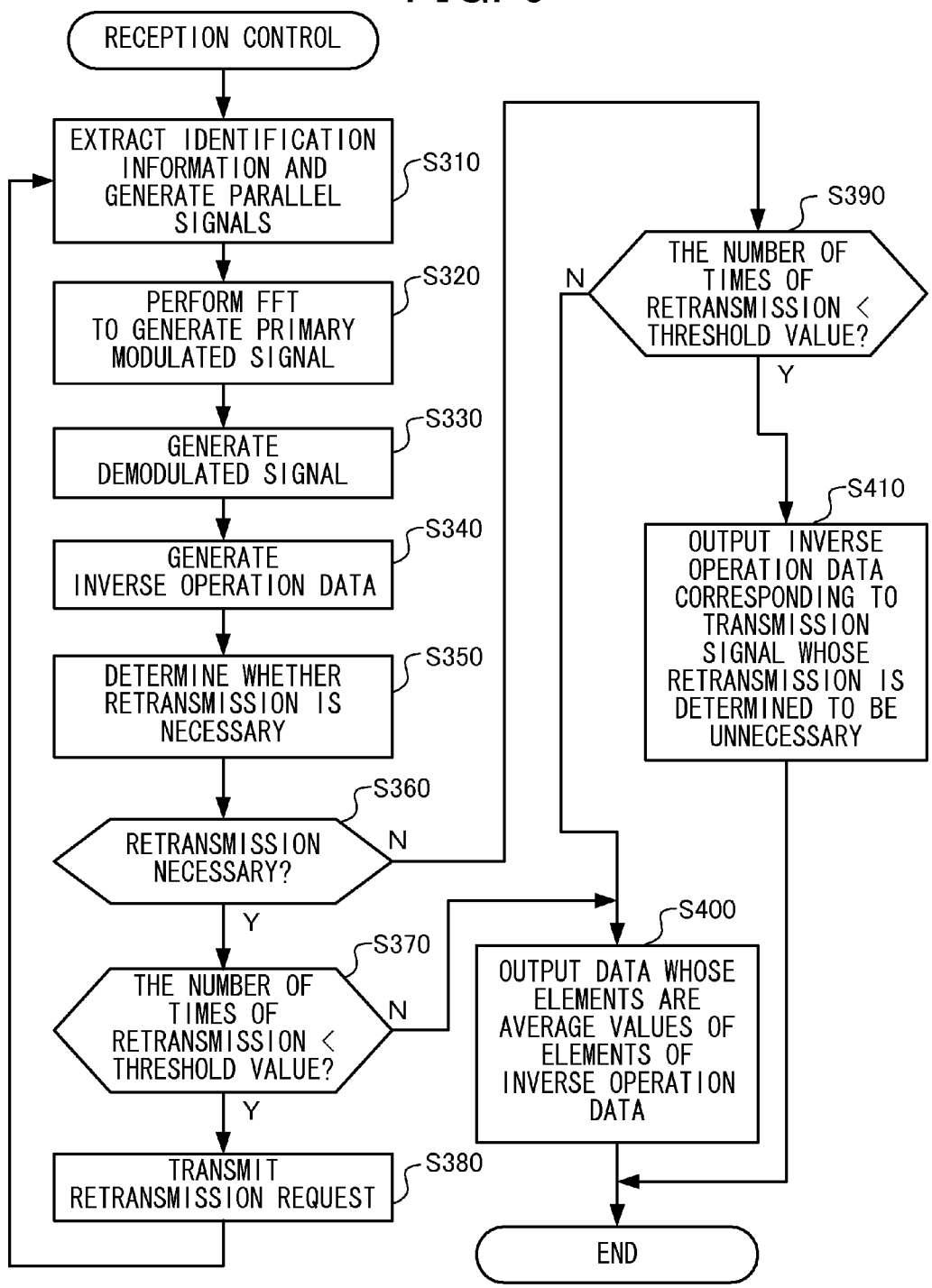
FIG. 9 is a flow chart illustrating one example of a reception control operation that is performed by the communication device according to the embodiment.

FIG. 9 is a flow chart illustrating one example of reception control operation that is performed by the communication device according to the embodiment. The receiver 36 receives a transmission signal via the antenna 30 and transmission/reception switch 37. Then, the receiver 36 extracts identification information from the received transmission signal, and subjects a baseband signal contained in the received transmission signal to serial-parallel conversion to generate parallel signals (step S310). The FFT calculator 35 subjects the parallel signals to FFT to generate primary modulated signals (step S320). The parallel-serial converter 34 subjects the primary modulated signals to parallel-serial conversion, and the demodulator 33 demodulates the primary modulated signal subjected to parallel-serial conversion to generate a demodulated signal (step S330). The inverse operator 32 generates inverse operation data whose elements are exclusive OR of respective elements of the demodulated signal and respective elements of a data sequence that are at the same positions as positions of the respective elements of the demodulated signal (step S340).

The determiner 38 determines whether retransmission of a transmission signal is necessary based on the number of elements of the primary modulated signals within a predetermined region on the complex plane (step S350). If the determiner 38 determines that retransmission of a transmission signal is necessary and the number of times of transmission of a retransmission request for a transmission signal that contains identification information identifying the same input signal as an input signal identified by identification information contained in the transmission signal is less than a threshold value (step S360; Y, step S370; Y), the retransmission request transmitter 39 transmits a retransmission request that contains identification information identifying the input signal to the communication device 1 (step S380). Then, reception control processing returns to step S310.

If the determiner 38 determines that retransmission of a transmission signal is necessary and the number of times of transmission of the retransmission request has reached a threshold value (step S360; Y, step S370; N), or if the determiner 38 determines that retransmission of a transmission signal is unnecessary and the number of times of transmission of the retransmission request has reached a threshold value (step S360; N, step S390; N), the linear combiner 31 outputs data whose elements are average values of respective elements of a plurality of pieces of inverse operation data corresponding to transmission signals that contain identification information identifying the same input signal as the received transmission signal has been generated (step S400).

If the determiner 38 determines that retransmission of a transmission signal is unnecessary and the number of times of transmission of the retransmission request is less than a threshold value (step S360; N, step S390; Y), the linear combiner 31 outputs inverse operation data corresponding to the transmission signal whose retransmission is determined to be unnecessary (step S410). Processing from steps S330 to S340 and processing from steps S350 to S390 may be concurrently performed.

As described above, the communication devices 1 and 3 according to the embodiment can reduce degradation of BER.

SPECIFIC EXAMPLE

Figure 10:
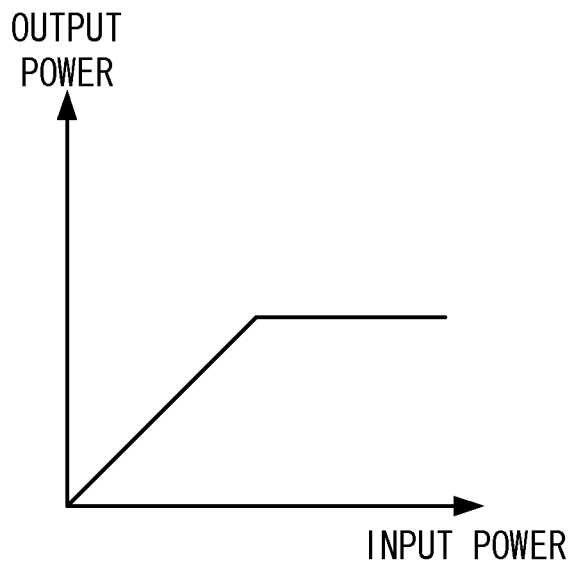
FIG. 10 is a diagram illustrating an example of characteristics of an amplifier.

Next, effects of the invention in the embodiment will be described using simulation. In the simulation, subjecting an input signal, which was a random signal, to modulation by a primary modulation scheme, serial-parallel conversion and IFFT to generate baseband signals, and calculating PAPR were repeatedly performed for a case in which an amplifier having an ideal linear characteristics was used and a case in which an amplifier having a nonlinear range was used. FIG. 10 is a diagram illustrating an example of characteristics of an amplifier. The simulation was performed using an amplifier having characteristics illustrated in FIG. 10 as an amplifier having a nonlinear range while changing an output signal saturation point a (unit: dBm). With a primary modulation scheme being QPSK and the size of FFT being 2048, the both cases were compared in CCDF (Complementary Cumulative Distribution Function) of PAPR, that is, characteristics of PAPR.

Figure 11:
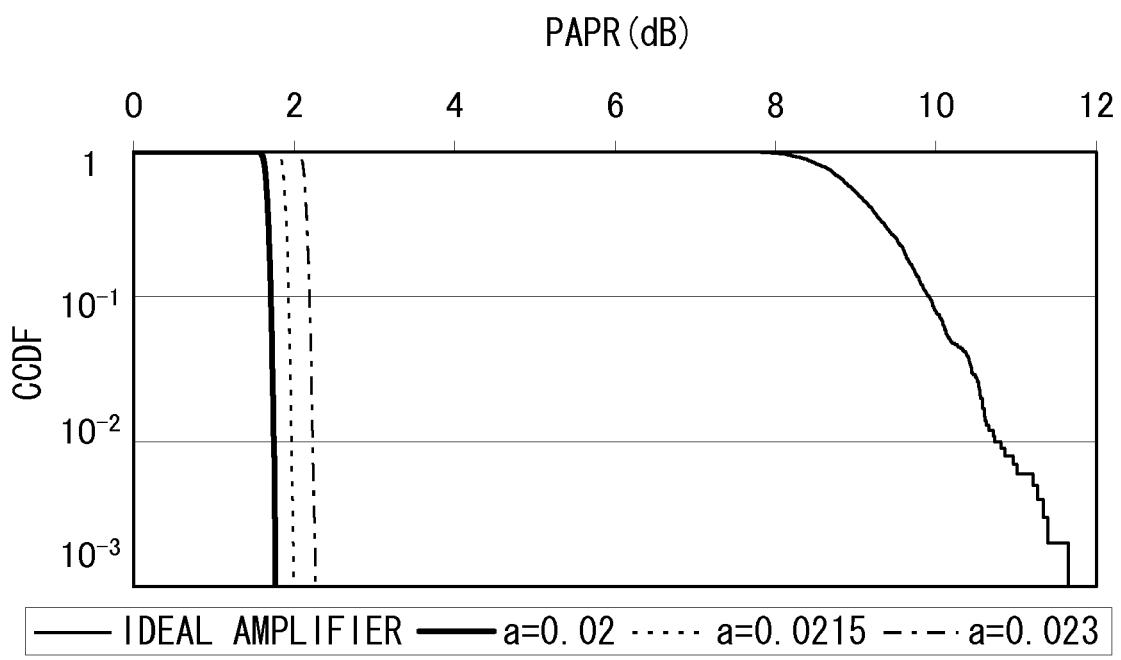
FIG. 11 is a graph illustrating CCDF characteristics of baseband signals according to characteristics of amplifiers.

FIG. 11 is a graph illustrating CCDF characteristics of baseband signals according to characteristics of amplifiers. The horizontal axis indicates PAPR (unit: dB) and the vertical axis indicates CCDF of PAPR. In the graph, a thin full line indicates CCDF characteristics of PAPR when an amplifier having an ideal linear characteristics was used, a thick full line indicates CCDF characteristics of PAPR when a =0.02, a dashed line indicates CCDF characteristics of PAPR when a =0.0215, and a dashed-dotted line indicates CCDF characteristics of PAPR when a =0.023. The graph shows that distortion occurs in output signals from the amplifier having a nonlinear range.

Figure 12:
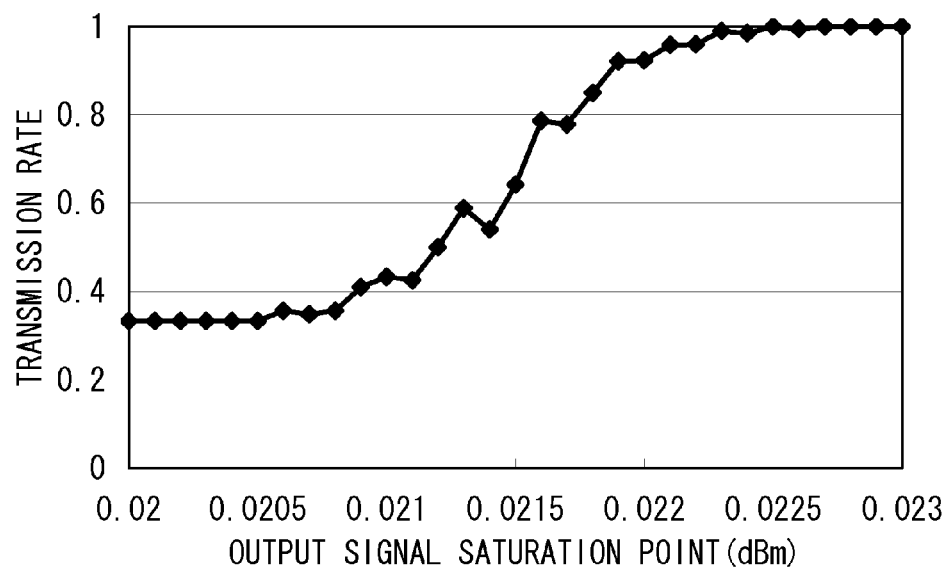
FIG. 12 is a graph illustrating relationship between output signal saturation points and transmission rates in the communication device according to the embodiment.

FIG. 12 is a graph illustrating relation between output signal saturation points and transmission rates in the communication devices according to the embodiment. FIG. 12 illustrates relation between output signal saturation points and transmission rates when the communication was performed by communication devices 1 and 3 according to the embodiment while an output signal saturation point a is being changed. A transmission rate is set to be 1 when a =0.023. The graph shows that as an output signal saturation point becomes smaller, that is, as distortion due to an amplifier increases, BER degrades and the number of times of retransmission increases, thereby degrading a transmission rate.

Simulation was performed for BER characteristics with a primary modulation scheme being QPSK and the size of FFT being 2048 while changing an output signal saturation point a, for communication in a conventional art and communication by the communication devices 1 and 3 according to the embodiment. A predetermined region to be used by the determiner 38 in the communication device 3 was set to be inside a square whose gravity point is each of points of a signal constellation diagram of QPSK and whose length of each side was 0.08, and a threshold value was set to be 100. The conventional art is an art in which an input signal is modulated by a primary modulation scheme, subjected to serial-parallel conversion and IFFT to generate baseband signals and the baseband signals are transmitted without the above retransmission processing.

Figure 13:
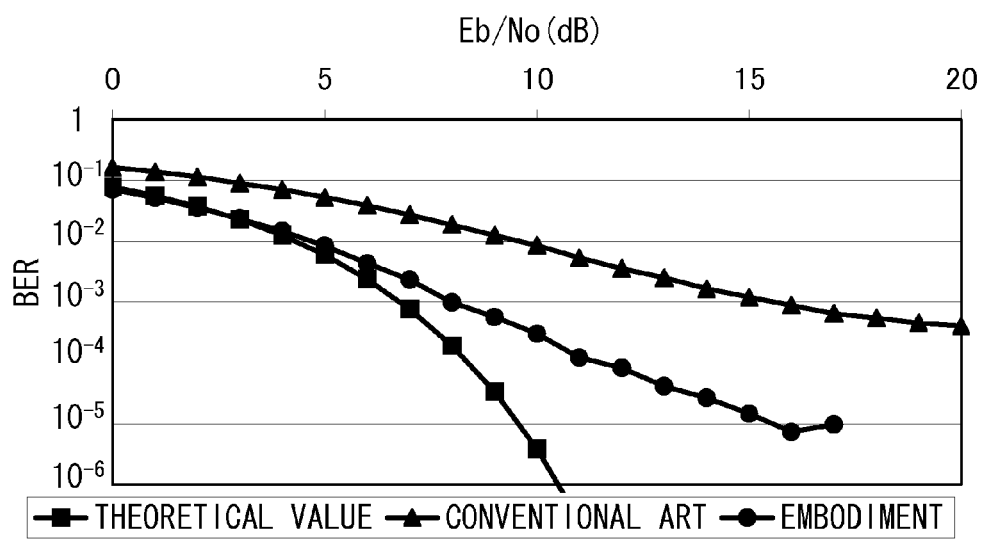
FIG. 13 is a graph illustrating BER characteristics in the communication device according to the embodiment.
Figure 14:
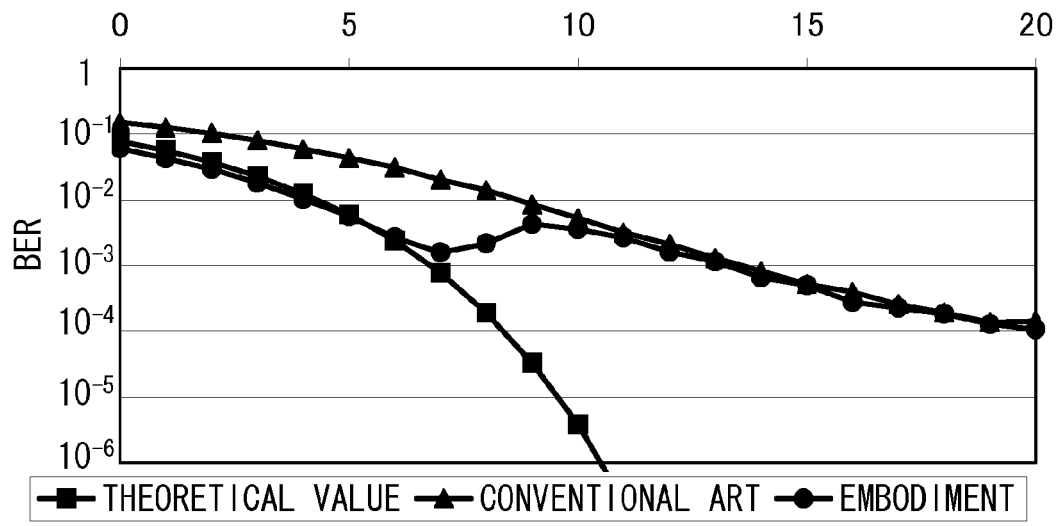
FIG. 14 is a graph illustrating BER characteristics in the communication device according to the embodiment.
Figure 15:
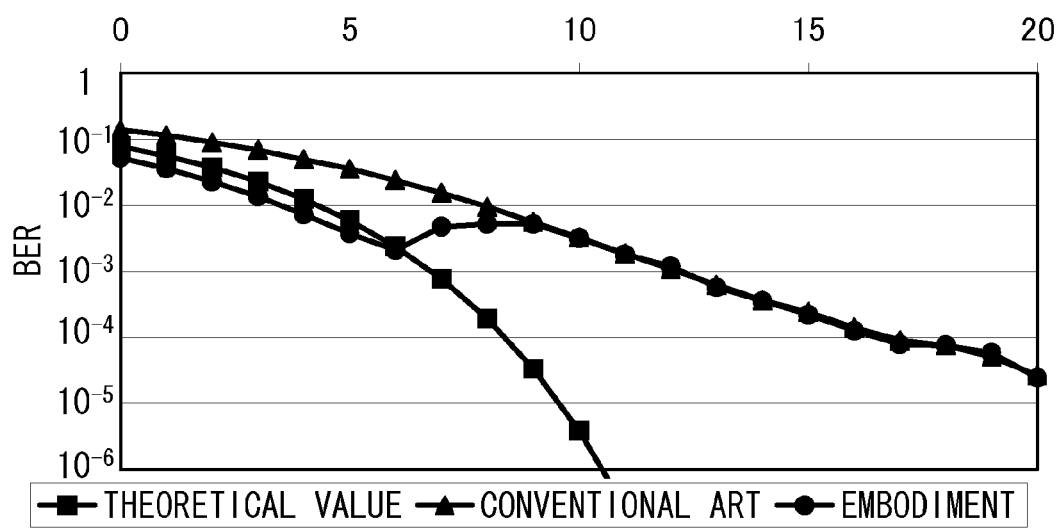
FIG. 15 is a graph illustrating BER characteristics in the communication device according to the embodiment.

FIGS. 13, 14 and 15 are graphs illustrating BER characteristics in the communication devices according to the embodiment. The horizontal axis is Eb/No (energy per bit to noise power spectral density ratio), and the vertical axis is BER. The unit of Eb/No is dB. In FIG. 13, a =0.02; in FIG. 14, a =0.0215; and in FIG. 15, a =0.023. In the graphs, plot points indicated by squares were theoretical values when an amplifier having ideal linear characteristics was used in OFDM communication and performing QPSK modulation. Plot points indicated by triangles were BER of a conventional art, and BER of plot points indicated by circles were BER when the communication devices 1 and 3 according to the embodiment were used. In any of FIGS. 13 to 15, when the communication devices 1 and 3 according to the embodiment were used, BER improved compared with BER in a conventional art; especially when a noise level was low, BER improved to the same degree as the theoretical values.

The above simulation shows that the communication devices 1 and 3 according to the embodiment can suppress degradation of BER.

An embodiment of the present invention is not limited to the above embodiment. A communication system the communication devices 1 and 3 use is not limited to OFDM, and CDMA (Code Division Multiple Access) or the like can be used. A primary modulation scheme of the modulator 11 is not limited to QPSK, and PSK (Phase Shift Keying), QAM (Quadrature Amplitude Modulation) or the like other than QPSK also can be used. A position of the serial-parallel converter 12 is not limited to the position in the above embodiment, but may be before the modulator 11. Similarly, a position of the parallel-serial converter 34 is not limited to the position in the above embodiment, but may be after the demodulator 33. The IFFT calculator 13 may perform IDFT instead of IFFT, and the FFT calculator 35 may perform DFT instead of FFT.

Even if the number of times of transmission of a retransmission request for a transmission signal containing the same identification information has reached a threshold value, if the determiner 38 determines that retransmission is unnecessary, the linear combiner 31 may output inverse operation data corresponding to a transmission signal whose retransmission is determined to be unnecessary.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A communication device comprising:
   a primary modulator that subjects an input signal to primary modulation to generate a primary modulated signal;
   a secondary modulator that subjects the primary modulated signal to secondary modulation based on a communication scheme to generate a secondary modulated signal;
   a transmitter that generates a transmission signal based on the secondary modulated signal and transmits the transmission signal;
   a retransmission request receiver that receives a retransmission request that contains identification information identifying the input signal;
   an operator that uses a data sequence that is a set of elements of a same number as a number of elements in the input signal and with element values of 1 or 0 to generate operation data whose elements are values of exclusive OR of respective elements of the input signal and respective elements of the data sequence that are at same positions as positions of the respective elements of the input signal; and
   a retransmitter, if the retransmission request receiver receives the retransmission request, that subjects an input signal identified by identification information contained in the retransmission request to processing by the operator and subjects resulting operation data as the input signal to processing by the primary modulator, the secondary modulator and the transmitter.

2. The communication device according to claim 1, wherein
   the transmitter transmits, as the transmission signal, a signal that contains identification information identifying the input signal, and
   if the retransmission request receiver receives the retransmission request, the retransmitter performs processing by the transmitter using identification information identifying an input signal identified by identification information contained in the received retransmission request.

3. The communication device according to claim 1, wherein
   if the retransmission request receiver has received a retransmission request previously and then receives another retransmission request that contains identification information identifying a same input signal as identified by the retransmission request received before, the retransmitter performs processing by the operator using a data sequence different from a data sequence used for processing by the operator for the other retransmission request received before.

4. The communication device according to claim 1, wherein
   the operator uses, as the data sequence, a data sequence generated in such a way that among elements of a pseudorandom noise sequence values of elements whose values are −1 are replaced by 0.

5. The communication device according to claim 1, wherein
   a receiver that receives the transmission signal and subjects a baseband signal contained in the received transmission signal to serial-parallel conversion to generate a parallel signal;
   a primary demodulator that demodulates the parallel signal based on the communication scheme to generate the primary modulated signal;
   a determiner that determines whether it is necessary to retransmit the transmission signal generated from the same input signal as the received transmission signal has been generated based on the number of elements within a predetermined region on a complex plane among elements of the primary modulated signal;
   a retransmission request transmitter that transmits the retransmission request that contains identification information identifying the same input signal as the received transmission signal has been generated if the determiner determines that retransmission of the transmission signal is necessary and a number of times of transmission of a retransmission request for the transmission signal is less than a threshold value;
   a secondary demodulator that demodulates the primary modulated signal to generate a demodulated signal;
   an inverse operator that uses the data sequence defined for each number of times of transmission of the retransmission request, the data sequence being the set of elements of the same number as the number of elements in the demodulated signal and with element values of 1 or 0 to generate inverse operation data whose elements are values of exclusive OR of respective elements of the demodulated signal and respective elements of the data sequence that are at same positions as positions of the respective elements of the demodulated signal; and
   an outputter that outputs the inverse operation data as reproduction data of the input signal.

6. The communication device according to claim 5, wherein
   the receiver extracts identification information identifying an input signal at transmission side that corresponds to the received transmission signal from the received transmission signal, and
   the retransmission request transmitter sets a number of times of transmission of the retransmission request based on a number of times of transmission of a retransmission request for a transmission signal that contains identification information identifying a same input signal as an input signal identified by the identification information extracted from the received transmission signal.

7. The communication device according to claim 5, wherein
if the determiner determines that retransmission of the transmission signal is unnecessary and the number of times of transmission of the retransmission request has not reached the threshold value, the outputter outputs the inverse operation data corresponding to the transmission signal whose retransmission is determined to be unnecessary.

8. The communication device according to claim 7, wherein
if the number of times of transmission of the retransmission request has reached the threshold value, the outputter outputs data whose elements are average values or average values of elements whose absolute values are maximum and elements whose absolute values are minimum, of respective elements of a plurality of pieces of inverse operation data corresponding to a plurality of transmission signals that contain identification information identifying the same input signal as the received transmission signal has been generated.

9. The communication device according to claim 5, wherein
the inverse operator uses, as the data sequence defined for each number of times of transmission of the retransmission request, a data sequence generated in such a way that among elements of a pseudorandom noise sequence values of elements whose values are −1 are replaced by 0.

10. A communication method comprising:
a primary modulation step of subjecting an input signal to primary modulation to generate a primary modulated signal;
a secondary modulation step of subjecting the primary modulated signal to secondary modulation based on a communication scheme to generate a secondary modulated signal;
a transmission step of generating a transmission signal based on the secondary modulated signal and transmitting the generated transmission signal;
a retransmission request receiving step of receiving a retransmission request that contains identification information identifying the input signal;
an operation step of using a data sequence that is a set of elements of a same number as a number of elements in the input signal and with element values of 1 or 0 to generate operation data whose elements are values of exclusive OR of respective elements of the input signal and respective elements of the data sequence that are at same positions as positions of the respective elements of the input signal; and
a retransmission step of subjecting an input signal identified by identification information contained in the received retransmission request to processing of the operation step and of subjecting resulting operation data as the input signal to processing of the primary modulation step, the secondary modulation step and the transmission step if the retransmission request is received at the retransmission request receiving step.

11. The communication method according to claim 10, wherein
a signal that contains identification information identifying the input signal is transmitted as the transmission signal at the transmission step, and
if the retransmission request is received at the retransmission request receiving step, processing at the transmission step is performed using identification information identifying an input signal identified by identification information contained in the received retransmission request at the retransmission step.

12. The communication method according to claim 10, wherein
if the retransmission request has been received before and then another retransmission request that contains identification information identifying a same input signal as identified by the retransmission request received before is received at the retransmission request receiving step, processing of the operation step is performed using a data sequence different from a data sequence used for processing of the operation step for the retransmission request that contains the identification information identifying the other input signal before at the retransmission step.

13. The communication method according to claim 10, wherein
at the operation step, a data sequence generated in such a way that values of elements whose values are −1 are replaced by 0 among elements of a pseudorandom noise sequence is used as the data sequence.

14. The communication method according to claim 10, wherein
a receiving step of receiving the transmission signal and of subjecting a baseband signal contained in the received transmission signal to serial-parallel conversion to generate a parallel signal;
a primary demodulation step of demodulating the parallel signal based on the communication scheme to generate the primary modulated signal;
a determination step of determining whether it is necessary to retransmit the transmission signal generated from the same input signal as the received transmission signal has been generated based on the number of elements within a predetermined region on a complex plane among elements of the primary modulated signal;
a retransmission request transmission step of transmitting the retransmission request that contains identification information identifying the same input signal as the received transmission signal has been generated if it is determined that retransmission of the transmission signal is necessary at the determination step and a number of times of transmission of a retransmission request for the transmission signal is less than a threshold value;
a secondary demodulation step of demodulating the primary modulated signal to generate a demodulated signal;
an inverse operation step of using the data sequence defined for each number of times of transmission of the retransmission request, the data sequence being the set of elements of the same number as the number of elements as the demodulated signal and with element values of 1 or 0 to generate inverse operation data whose elements are values of exclusive OR of respective elements of the demodulated signal and respective elements of the data sequence that are at same positions as positions of the respective elements of the demodulated signal; and
an output step of outputting the inverse operation data as reproduction data of the input signal.

15. The communication method according to claim 14, wherein
at the receiving step, identification information identifying an input signal at transmission side that corresponds to the received transmission signal is extracted from the received transmission signal, and at the retransmission request transmission step, a number of times of transmission of the retransmission request is set by a number of transmission of a retransmission request for a transmission signal that contains identification information identifying a same input signal as an input signal identified by identification information extracted from the received transmission signal.

16. The communication method according to claim 14, wherein if it is determined that retransmission of the transmission signal is unnecessary at the determination step and the number of times of transmission of the retransmission request has not reached the threshold value, the inverse operation data that corresponds to the transmission signal whose retransmission is determined to be unnecessary is outputted at the output step.

17. The communication method according to claim 16, wherein if the number of times of transmission of the retransmission request has reached the threshold value, data whose elements are average values or average values of elements whose absolute values are maximum and elements whose absolute values are minimum, of respective elements of a plurality of pieces of inverse operation data that correspond to a plurality of transmission signals that contain identification information identifying a same input signal as the received transmission signal has been generated is outputted at the output step.

18. The communication method according to claim 14, wherein a data sequence generated in such a way that among elements of a pseudorandom noise sequence values of elements whose values are −1 are replaced by 0 is used, as the data sequence defined for each number of times of transmission of the retransmission request, at the inverse operation step.

* * * * *